US008683588B2

(12) United States Patent
Esteban et al.

(10) Patent No.: US 8,683,588 B2
(45) Date of Patent: Mar. 25, 2014

(54) METHOD OF AND APPARATUS FOR MONITORING FOR SECURITY THREATS IN COMPUTER NETWORK TRAFFIC

(75) Inventors: David Esteban, Madrid (ES); David Scarlatti, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/527,419

(22) Filed: Jun. 19, 2012

(65) Prior Publication Data

US 2013/0007879 A1    Jan. 3, 2013

(30) Foreign Application Priority Data

Jun. 29, 2011 (EP) .................................. 11382220

(51) Int. Cl.
*G06F 11/00* (2006.01)
*G06F 12/14* (2006.01)
*G06F 12/16* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| 7,540,025 | B2 * | 5/2009 | Tzadikario ...................... 726/22 |
| 7,770,211 | B2 * | 8/2010 | Kobayashi ........................ 726/3 |
| 2003/0237000 | A1 | 12/2003 | Denton et al. |
| 2005/0188423 | A1 * | 8/2005 | Motsinger et al. .............. 726/22 |
| 2005/0262560 | A1 * | 11/2005 | Gassoway ....................... 726/22 |
| 2007/0153689 | A1 * | 7/2007 | Strub et al. .................... 370/230 |

OTHER PUBLICATIONS

Extended European Search Report for Application No. EP11382220.9 mailed Nov. 10, 2011, 5 pages.
Communication pursuant to Article 94(3) EPC for Application No. EP11382220.9 mailed Jul. 19, 2013, 5 pages.

* cited by examiner

*Primary Examiner* — Dant Shaifer Harriman
(74) *Attorney, Agent, or Firm* — Toler Law Group, PC

(57) ABSTRACT

A method of and apparatus for monitoring for security threats in computer network traffic is disclosed. The method comprises operating computer processing means to carry out the steps of: monitoring traffic between a network to be protected and a second network, through a first gateway; in response to determining traffic between the network to be protected and a new host in the second network, accessing the new host through a second gateway; and comparing traffic between the network to be protected and the new host through the first gateway with traffic between the computer processing means and the new host through the second gateway, to detect an anomaly therebetween. The apparatus comprising the computer processing means, the computer processing means programmed and operable to carry out the method.

20 Claims, 3 Drawing Sheets

METHOD OF AND APPARATUS FOR MONITORING FOR SECURITY THREATS IN COMPUTER NETWORK TRAFFIC

CLAIM OF PRIORITY

The present application claims priority to European Patent Application No. 11382220.9 filed Jun. 29, 2011 and entitled "Multi-Agent based Network Compromised Detection System," which is incorporated by reference herein in its entirety.

FIELD

This disclosure relates to a method of and apparatus for monitoring for security threats in computer network traffic.

BACKGROUND

Most computer networks are connected to the Internet. This is particularly the case with networks operated by companies to allow communication between the computers of employees of those companies (sometimes referred to as "enterprise networks"). Even with the correct use of "firewalls", the flow of network traffic between an enterprise network and the Internet can be used by hackers to attack the enterprise network. Current intrusion detection systems (IDS) and intrusion protection systems (IPS) are based on inspecting packets in data traffic and comparing these with patterns, sometimes referred to as "packet signatures", recorded in a database indicative of previous attacks. An alert is issued when an inspected packet matches one of previously recorded signatures. However, as this approach checks against a record of previous attacks, it can fail to detect or protect against new attacks that may differ from previous ones. This is one drawback with existing approaches.

Furthermore, it is difficult to address this shortcoming by basing an IDS or IPS on identifying anomalous behaviour in network activity that might be indicative of an attack, as it can be difficult to identify a regular pattern of activity on most networks, and so detecting anomalies in such a pattern is at least as problematic.

As compromised network security can have catastrophic consequences for a company, and indeed for governmental organisations, there exists an urgent need to address these problems and to provide a solution for detecting malicious activity directed at networks.

SUMMARY

According to a first aspect of this disclosure, there is provided a method of monitoring for security threats in computer network traffic, the method comprising operating computer processing means to carry out the steps of:
  monitoring traffic between a network to be protected and a second network, through a first gateway;
  in response to determining traffic between the network to be protected and a new host in the second network, accessing the new host through a second gateway; and
  comparing traffic between the network to be protected and the new host through the first gateway with traffic between the computer processing means and the new host through the second gateway, to detect an anomaly therebetween.

A "new" host may be defined as a first-time host for traffic between the network to be protected and the second network. The method may comprise the step of checking each host that is accessed against a record of previously accessed hosts to determine that a host is being accessed for the first time. One, more or each host may be identified by its or their URL.

By performing the comparison defined above and in more detail below, embodiments are able to identify an anomaly that may be indicative of a security attack on the network to be protected. As the method does not rely on "packet signatures" that are indicative of only historic attacks, embodiments are able to guard effectively against new attacks for which no "packet signature" exists. Embodiments therefore address the shortcomings of existing IDS and IPS.

The step of monitoring traffic between the network to be protected and the second network through the first gateway may comprise the computer processing means monitoring traffic through a firewall of the network to be protected. The firewall may be a three-legged firewall. The computer processing means may be arranged to monitor traffic between the network to be protected and the first gateway from behind the firewall. The computer processing means may be able to access the second gateway from in front of the firewall.

[Exception to Established Pattern]

The method may also comprise the step of monitoring for an exception to an established pattern in the traffic between the network to be protected and a particular, given or known host in the second network, through the first gateway. The method may also comprise the step of, in response to determining an exception to the established pattern in the traffic, the computer processing means accessing the particular, given or known host through the second gateway and comparing traffic between the network to be protected and the particular, given or known host through the first gateway with traffic between the computer processing means and the particular, given or known host through the second gateway, to detect an anomaly therebetween.

The exception to the established pattern in the traffic may be, for example, an unusual volume of traffic and/or traffic at an unusual time of the day or week or year. There may be other exceptions.

[Periodic Check]

The method may also include the steps of the computer processing means: periodically identifying one, more or each host in the second network to or from which traffic is flowing from or to the network to be protected, through the first gateway; accessing through the second gateway the or each identified host in the second network; and comparing traffic between the network to be protect and the or each identified host in the second network with traffic between the computer processing means and the or each identified host through the second gateway, to detect an anomaly therebetween.

The method may comprise the step of issuing an alert in response to detecting the anomaly. The alert may be communicated to a user and/or administrator of the network to be protected.

[Comparison]

The step of comparing the traffic to detect an anomaly may comprise comparing the traffic to detect an anomaly indicative of one or more of, for example: port scanning traffic, fire walking, IP fragmentation, address spoofing, and sniffing. The step of comparing the traffic to detect an anomaly may comprise comparing the traffic to ascertain if traffic through one of the gateways violates a protocol, but traffic through the other gateway does not. It may comprise comparing traffic to ascertain if a traffic pattern exists in the traffic through one gateway but not through the other. The comparison may comprise comparing basic packet information; it may comprise comparing information in fields at different layers of the network stack. Examples of packet information at TCP header level that may be compared are "Sequence Number", "Offset" and/or "ACK number". Examples of packet information at IP header level that may be compared are "Fragment offset", "Time to Live" and/or "source IP". As different fields can be altered by each attack on the network to be protected, some attacks will affect more basic layers of the communication while others will affect higher levels. Crossing some or all layers and selecting specific fields makes the comparison more robust in the face of different forms of attack.

The step of accessing the new host through the second gateway in response to detecting traffic with the new host may comprise using the same ports and/or protocols as used by traffic through the first gateway.

[Communication with Trusted Host]

The method may comprise the step of the computer processing means, in response to detecting an anomaly, accessing a trusted host through a third gateway to cause the trusted host to communicate with the network to be protected and/or the computer processing means. The trusted host may be caused in this way to communicate with the network to be protected through the first gateway and with the computer processing means through the second gateway.

The trusted host may be outside the network to be protected.

Accessing the trusted host through the third gateway may be over a wireless link. The wireless link may be between the computer processing means and the third gateway. Communication with the third gateway may be over a satellite link. It may be over WIFI; it may be another other wireless link. The step of accessing the trusted host through the third gateway may be preceded by the step of the computer processing means establishing a communication link to the third gateway and/or activating the third gateway. The establishing may also be in response to detecting the anomaly. The communication link to the third gateway may normally not be established. The communication link to the third gateway may be established only in response to detecting the anomaly. Once the trusted host has been accessed, the computer processing means may operate to return the third gateway and/or the link thereto to an inactive state.

The computer processing means may compare traffic between the network to be protected and the trusted host through the first gateway with traffic between the computer processing means and the trusted host through the second gateway to verify whether or not the detected anomaly is indicative of a security threat to the network to be protected. The comparison may be the same as or similar to the comparison carried out previously between traffic with the new host. Optional features of that comparison may therefore be optional features of this comparison. One difference, however, is that the connection is initiated from outside the network to be protected. The comparison of traffic with the trusted host may be followed by the step of ascertaining whether or not the anomaly previously detected is repeated, or substantially repeated, in that traffic. Should it be ascertained that the anomaly is repeated, or substantially repeated, then this may be taken as the detected anomaly being indicative of a security threat to the network to be protected.

In response to determining that the detected anomaly is indicative of a security threat, the method may include the step of the computer processing means issuing an alert. The alert may be communicated to a user and/or administrator of the network to be protected.

[Other Features]

The second network may be the Internet. The first and/or second and/or third gateway may be a gateway node. The first gateway may be a first Internet Service Provider (ISP). The second gateway may be a second ISP. The third gateway may be a third ISP; it may be a satellite ISP.

The computer processing means may comprise a first interface for monitoring traffic between the network to be protected and the second network. The computer processing means may comprise a second interface for accessing the second network through the second gateway. The first interface may comprise a first network interface card. The second interface may comprise a second network interface card.

[Other Aspects]

According to a second aspect of this disclosure, there is provided apparatus comprising computer processing means, the computer processing means programmed and operable to carry out a method as defined hereinabove.

According to a third aspect of this disclosure, there is provided a computer program comprising code portions executable by computer processing means to cause those means to carry out a method as defined hereinabove.

According to a fourth aspect of this disclosure, there is provided a computer program product comprising thereon or therein a record of instructions readable and executable by computer processing means to cause those means to carry out a method as defined hereinabove.

The computer program product may be a record carrier. The computer program product may be a signal, such as, for example, an electrical signal, an infra-red signal or a radio frequency signal. The record carrier may comprise solid state memory, such as, for example, a ROM, EPROM or EEPROM. The record carrier may comprise optical or magnetic storage media, such as, for example a CD-ROM or DVD-ROM.

According to a sixth aspect of this disclosure, there is provided a system comprising the computer processing means defined hereinabove and the network to be protected. The system may also comprise the firewall and/or the first gateway and/or the second gateway and/or the third gateway and/or the trusted host. The system may also comprise the second network.

According to a sixth aspect of this disclosure, there is provided a method of monitoring for security threats in computer network traffic, the method comprising operating computer processing means to carry out the steps of:

monitoring traffic between a network to be protected and a second network, through a first gateway;

in response to determining an exception to an established pattern in the traffic between the network to be protected and a particular, given or known host in the second network, accessing the particular, given or known host through the second gateway comparing traffic between the network to be protected and the particular, given or known host through the first gateway with traffic between the computer processing means and the particular, given or known host through the second gateway, to detect an anomaly therebetween.

It is envisaged that optional features of any of the other aspects also be optional features of this aspect.

According to a seventh aspect of this disclosure, there is provided a method of monitoring for security threats in computer network traffic, the method comprising operating computer processing means to carry out the steps of:

periodically identifying one, more or each host in the second network to or from which traffic is flowing from or to the network to be protected, through the first gateway;

accessing through the second gateway the or each identified host in the second network; and comparing traffic between the network to be protect and the or each identified host in the second network with traffic between the computer processing means and the or each identified host through the second gateway, to detect an anomaly therebetween.

second network, accessing the particular, given or known host through the second gateway It is envisaged that optional features of any of the other aspects also be optional features of this aspect.

According to an eighth aspect of this disclosure, there is provided a method of operating a trusted host to identify a security threat to a network to be protected that is connectable to a second network through a first gateway, the trusted host being connectable to the second network, and the method comprising the steps of the trusted host: being accessed through a third gateway and in response thereto communicating with a first network through the first gateway, and with computer processing means through a second gateway.

It is envisaged that optional features of any of the other aspects also be optional features of this aspect.

According to a ninth aspect of this disclosure, there is provided a trusted host as defined hereinabove.

BRIEF DESCRIPTION OF THE DRAWINGS

Specific embodiments of the invention are described below by way of non-limiting example only and with reference to the accompanying drawings, in which.

SPECIFIC DESCRIPTION OF CERTAIN EXAMPLE EMBODIMENTS

Figure 1:
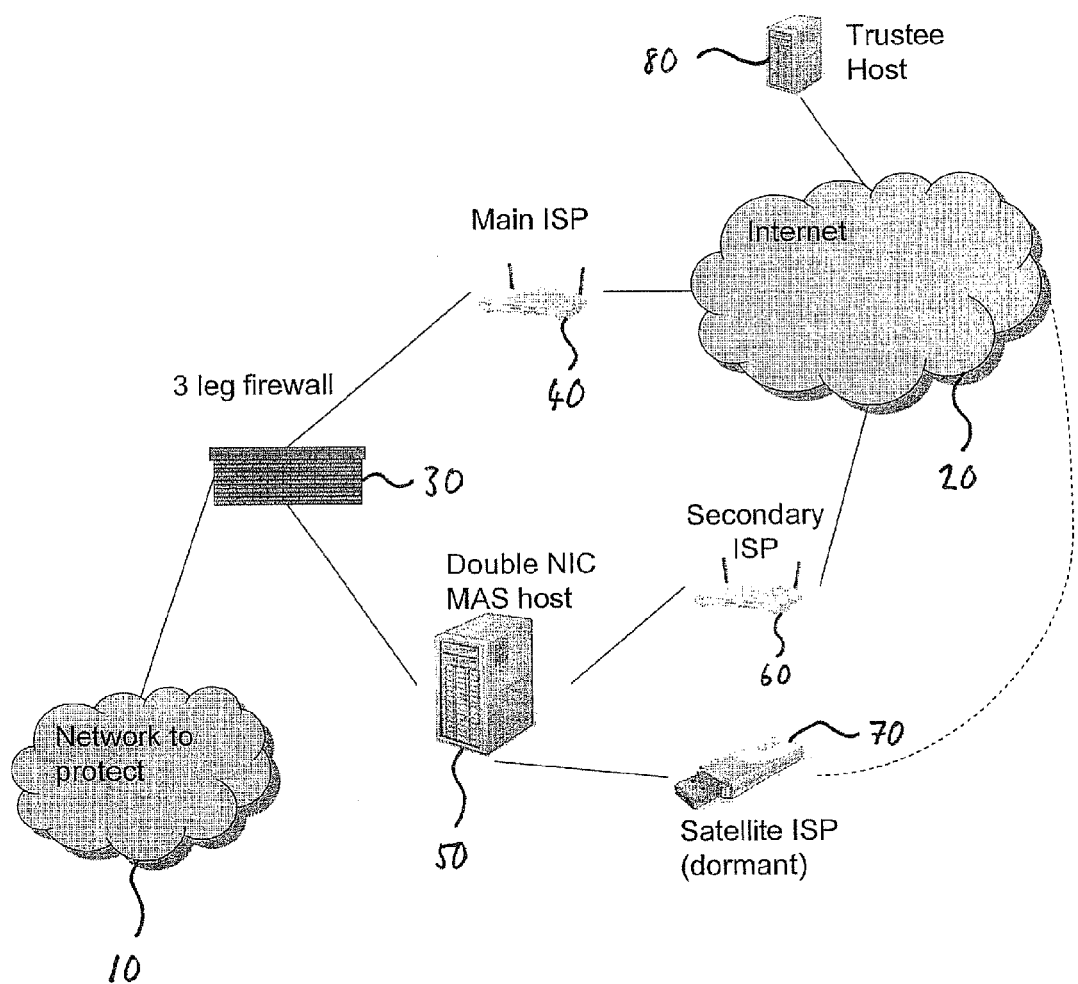
FIG. 1 shows in schematic form hardware arranged for monitoring for security threats in computer network traffic.

FIG. 1 shows a network to be protected in the form of an enterprise network 10 in communication with the Internet 20. Communication between the enterprise network 10 and the Internet 20 is through a three-leg firewall 30 and a first ISP in the form of a main ISP 40. The firewall 30 forms part of the enterprise network 10 and is in communication with the main ISP 40, which provides a gateway to the Internet 20. Although not shown, it will be understood that many hosts are connected to the Internet 20. These hosts may be accessed by users on the enterprise network 10, through the firewall 30 and the main ISP 40. Thus, network traffic flows between the enterprise network 10 and hosts on the Internet 20. So far, the arrangement is conventional.

Also shown in FIG. 1 is computer processing means in the form of a multi-agent system (MAS) host 50. The MAS host 50 and its method of operating, as controlled by software running thereon, are not conventional. The MAS host 50 is a computer system having two network interface cards (not shown). Although it is envisaged the MAS host 50 may be embodied by any suitable hardware, in the present embodiment, the MAS host 50 is a network appliance in which software executable by the appliance to cause it to execute the method described herein is embedded. An example of such a network appliance, from a hardware point of view, is the REACTOR CORE from PION. A first one of the network interface cards provides a connection to the firewall 30 such that the MAS host 50 can monitor traffic between the enterprise network 10 and the Internet 20, through the main ISP 40. This connection between the MAS host 50 and the firewall 30 is behind the firewall 30. A second one of the network interface cards provides a connection to a second ISP in the form of a secondary ISP 60, which is of course connected to the Internet 20. This provided the MAS host with an internet connection that is in front of the firewall 30. The two interface cards are separate, such that there is no communication between the enterprise network 10 and the secondary ISP 60.

The MAS host 50 also has a third interface that provides a connection to a normally dormant third ISP in the form of a satellite ISP 70. By "normally dormant", it is meant that there is usually no active connection between the MAS host 50 and the satellite ISP 70. As would be expected, the satellite ISP 70 provides a connection to the Internet 20.

It has been mentioned that there are many unshown hosts connected to the Internet 20. One of these hosts, a trusted host 80, is however shown in FIG. 1. This will be explained in more detail below.

The method of operation of the arrangement shown in FIG. 1, and in particular of the MAS host 50, will now be described. As mentioned, the method of operation of the MAS host 50 is determined by software running on the MAS host 50.

Figure 2:
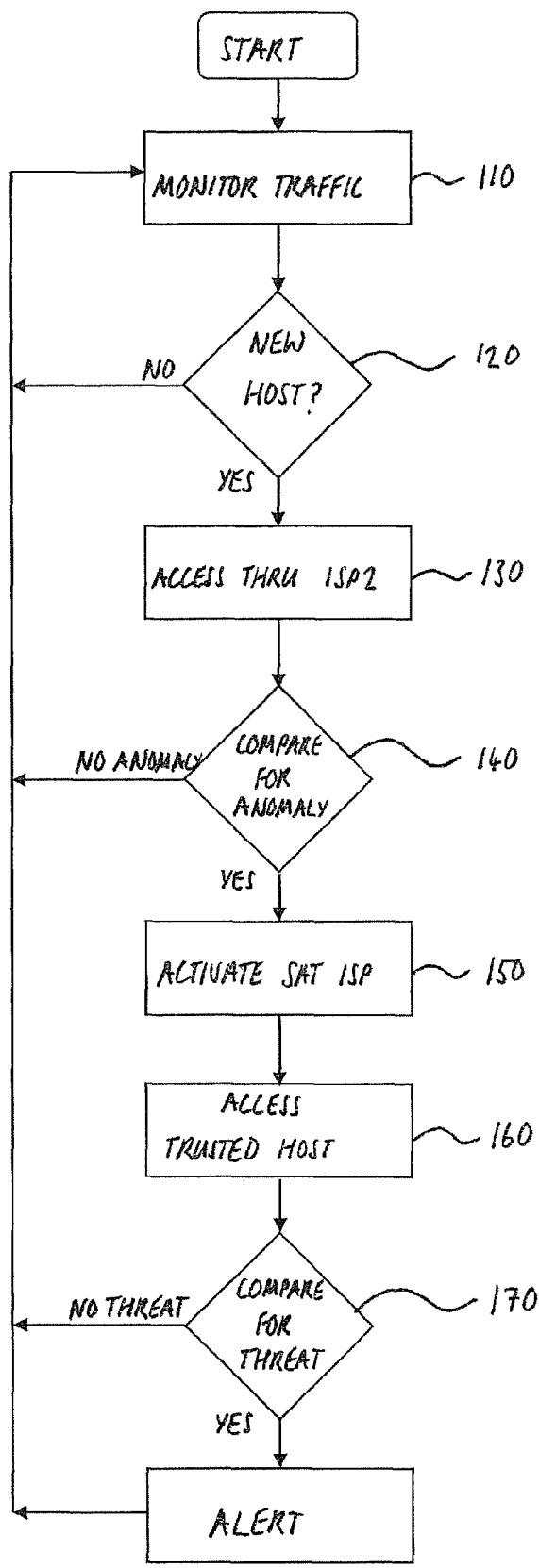
FIG. 2 is a flowchart illustrating a method of monitoring for security threats in computer network traffic.

With reference to FIG. 2, in a first step 110, the MAS host 50 monitors the traffic between the enterprise network 10 and the Internet 20 through firewall 30 and the main ISP 40. The traffic is monitored in both directions. It does this by using its first network interface card to communicate with the firewall 30.

At step 120, the MAS host 50 checks each host that appears in the network traffic to see whether or not it is a new host on the Internet 20. This is done by consulting a record of URLs to which the MAS host 50 has access, the URLs being indicative of hosts that have previously been accessed. This list is of all hosts accessed by the enterprise network 10. Should a new host be identified at step 120, the method proceeds to step 130. Regardless of whether or not a new host is identified, the step 110 of monitoring the traffic and step 120 of checking for a new host are carried out continuously.

At step 130, the MAS host 50 accesses the new host identified in step 120. This new host is accessed by the MAS host 50 through the secondary ISP 60. This is done by using the second network interface card that is connected to the secondary ISP 60. When accessing the new host, the MAS host 50 uses the same ports and protocols as used in the traffic between the enterprise network 10 and the new host through the firewall 30 and the main ISP 40.

The method then proceeds to step 140 in which the traffic between the enterprise network 10 and the new host through the firewall 30 and main ISP 40 is compared with the traffic between the MAS host 50 and the new host through the secondary ISP 60. If an attacker has managed to compromise the security of the enterprise network 10, this will in most cases affect the traffic between the enterprise network 10 and the host through the firewall 30 and main ISP 40 in a way that will not be present in traffic between the MAS host 50 and the host through the secondary ISP 60. Thus, there will be an anomaly between the two streams of traffic. In this comparison, the MAS host 50 is therefore looking for anomalies between these two streams of traffic. This is done by comparing basic packet information, including fields at different layers of the network stack.

Examples of packet information at TCP header level that are compared are "Sequence Number", "Offset" and "ACK number". Examples of packet information at IP header level that are compared are "Fragment offset", "Time to Live" and "source IP". Different fields can be altered by each attack on the enterprise network 10. Some attacks will affect more basic layers of the communication while others will affect higher levels. Crossing all layers and selecting specific fields makes the comparison more robust in the face of different forms of attack.

In this embodiment, the MAS host 50 is looking for anomalies indicative of, for example, port scanning traffic, fire walking, IP fragmentation, address spoofing and sniffing. This list is not exhaustive. Should an anomaly be found, the method proceeds to step 150.

At step 150, the MAS host 50 activates the connection to the satellite ISP 70. Before activation in this step, this connection to the satellite ISP 70 was dormant. This access point cannot be known to any attacker as it is "off", i.e. not activated, until an anomaly is detected in step 140.

At step 160, and upon activation of the satellite ISP 70, the MAS host 50 accesses the trusted host 80 and causes the trusted host 80 to do two things. Firstly, the trusted host 80 communicates with the enterprise network 10 through the main ISP 40 and the firewall 30. Secondly, the trusted host 80 communicates with the MAS host 50 through the secondary ISP 60. The trusted host 80 is so-called because it has not previously accessed any suspicious host and so there is a high degree of confidence that its security has not been compromised. The satellite ISP 70 is then deactivated and so resumes its dormant state.

The method proceeds to step 170 at which the MAS host 50 compares the traffic through the firewall 30 between the enterprise network and the trusted host 80 with the traffic between the MAS host 50 and the trusted host to verify whether or not the anomaly identified at step 140 is indicative of the security of the enterprise network being compromised. In this embodiment, the comparison performed in step 170 is the same as that performed in step 140. However, it should be noted that the information used in this comparison is highly unlikely to be affected by an attack as the relevant connection is initiated from outside the enterprise network and by a host that has not been in communication with the source of an attack. This communication with the trusted host 80 therefore acts as a reliable check. If the anomaly detected at step 140 is not repeated in the comparison performed at step 170, then this is indicative of the anomaly being representative of compromised security. Should it be determined that security has been compromised, the method proceeds to step 180 at which an alert is issued to a network administrator.

The method has been illustrated as a linear flow chart with the flow returning to the step 110 of monitoring traffic through the firewall 30 and main ISP 40. This has been done for simplicity of explanation. It will be appreciated however that certain of the steps may be carried out substantially in parallel. For example, it is envisaged that the traffic monitoring step 110 be on going whilst others of the steps are being performed.

Figure 3:
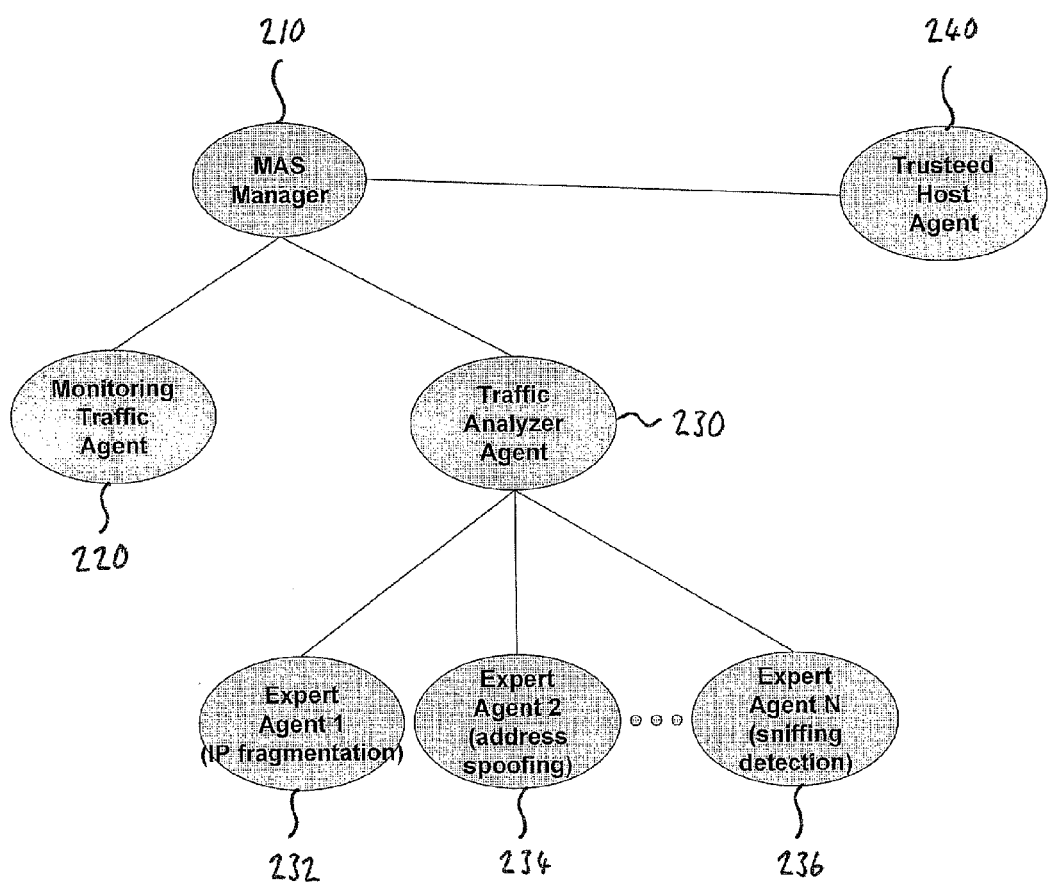
FIG. 3 shows in schematic form agents forming at least part of software that is executable to carry out the method of FIG. 2.

It is envisaged that, in this embodiment, software running on the MAS host 50 be arranged as shown in FIG. 3. With reference to FIG. 3, the software is organised into several agents running under the control of a MAS manager 210. The agents include a monitoring traffic agent 220, a traffic analyser agent 230 and a trusted host agent 240. The traffic analyser agent in turn communicates with and collects information from several expert agents, each arranged to detect a specific type of anomaly between compared streams of traffic. For example, there may be an expert agent for IP fragmentation 232, an expert agent for address spoofing 234 and an expert agent for sniffing detection 236. Although not shown, there is a respective expert agent for each other type of anomaly which the MAS host 50 is arranged to detect.

Different ones of the agents carry out different ones of the steps of the method shown in and described with reference to FIG. 2. In this embodiment, the monitoring traffic agent 220 carries our steps 110 and 120. The traffic analyser agent 230 and the individual expert agents 232, 234, 236 carry out the comparison steps of 140 and 170 The trusted host agent 240 carries out step 160.

In other embodiments, it is envisaged that as well as, or instead of, step 120 of comparing the traffic through the firewall 30 and the main ISP with the traffic through the secondary ISP 60 upon identifying a new host, the MAS host 50 monitors for an exception to an established pattern in the traffic between the enterprise network 10 and a particular host connected to the Internet 20 (through the firewall 30 and the main ISP 40). In response to determining an exception to the established pattern in the traffic, the MAS host 50 accesses the particular host through the secondary ISP 60 and compares the traffic in the same was as in step 120 to detect an anomaly therebetween. Upon detecting an anomaly, the subsequent steps are as described above. The exception to the established pattern in the traffic may be, for example, an unusual volume of traffic and/or traffic at an unusual time of the day or week or year.

In still other embodiments, again as an additional or alternative feature to comparing traffic when a new host is identified and/or comparing traffic when an exception to an established pattern is identified, the MAS host 50 periodically identifies one, more or each host in the Internet 20 to or from which traffic is flowing from or to the enterprise network 10 (through the firewall 30 and the main ISP 40). The MAS host 50 then accesses through the secondary ISP 60 the or each identified host and, again, compares the traffic to detect an anomaly therebetween. Should an anomaly be detected, the subsequent steps are as before.

The embodiments described above are a selected number of non-limiting examples within the scope of the appended claims. Other embodiments and variations of the embodiments described above will present themselves to the skilled addressee in the light of the forgoing disclosure. It will be understood that the claims, and hence the extent of protection conferred by the claims, will also encompass any such other embodiments.

The invention claimed is:

1. A method of monitoring for security threats in computer network traffic, the method comprising:
    monitoring, by a multi-agent system host, a first stream of traffic between a network to be protected and a second network through a first gateway;
    determining, by the multi-agent system host, whether the first stream of traffic being monitored includes traffic between the network to be protected and a new host in the second network;
    in response to determining the traffic between the network to be protected and the new host in the second network, accessing, by the multi-agent system host, the new host through a second gateway to generate a second stream of traffic; and
    comparing, by the multi-agent system host, the first stream of traffic between the network to be protected and the new host through the first gateway and the second stream of traffic between the multi-agent system host and the new host through the second gateway to detect an anomaly therebetween.

2. The method according to claim 1, further comprising:
    monitoring, by the multi-agent system host, for an exception to an established pattern in traffic between the network to be protected and a particular host in the second network through the first gateway; and in response to determining the exception to the established pattern in the traffic between the network to be protected and the particular host in the second network, accessing, by the multi-agent system host, the particular host through the second gateway and comparing (i) traffic between the network to be protected and the particular host through the first gateway and (ii) traffic between the multi-agent system host and the particular host through the second gateway to detect an anomaly therebetween.

3. The method according to claim 2, wherein the exception to the established pattern in the traffic between the network to be protected and the particular host in the second network through the first gateway comprises at least one of an unusual volume of traffic, traffic at an unusual time of day, traffic at an unusual day of the week, or traffic at an unusual time of year.

4. The method according to claim 1, further comprising:
periodically identifying, by the multi-agent system host, one or more hosts in the second network to or from which traffic is flowing from or to the network to be protected through the first gateway;
accessing, by the multi-agent system host, through the second gateway each identified one or more hosts in the second network; and
comparing, by the multi-agent system host, (i) traffic between the network to be protected and each identified one or more hosts in the second network and (ii) traffic between the multi-agent system host and each identified one or more hosts through the second gateway to detect an anomaly therebetween.

5. The method according to claim 1, wherein the anomaly is indicative of at least one of port scanning traffic, fire walking, IP fragmentation, address spoofing, or sniffing.

6. The method according to claim 1, wherein comparing comprises at least one of comparing the first stream of traffic and the second stream of traffic to ascertain if traffic through one of the gateways violates a protocol, but traffic through the other gateway does not; or comparing the first stream of traffic and the second stream of traffic to ascertain if a traffic pattern exists through one of the gateways but not through the other gateway.

7. The method according to claim 1, wherein comparing comprises at least one of comparing basic packet information or comparing information in fields at different layers of a network stack.

8. The method according to claim 1, wherein accessing the new host through the second gateway comprises using at least one of common ports or common protocols as used by traffic through the first gateway.

9. The method according to claim 1, further comprising:
in response to detecting the anomaly, accessing, by the multi-agent system host, a trusted host through a third gateway to cause the trusted host to communicate with the network to be protected through the first gateway and to communicate with the multi-agent system host through the second gateway; and
comparing, by the multi-agent system host, (i) traffic between the network to be protected and the trusted host through the first gateway and (ii) traffic between the multi-agent system host and the trusted host through the second gateway to verify whether or not the detected anomaly is indicative of a security threat to the network to be protected.

10. The method according to claim 9, wherein accessing the trusted host through the third gateway is preceded by the multi-agent system host establishing a communication link to the third gateway and activating the third gateway in response to detecting the anomaly.

11. The method according to claim 10, wherein once the trusted host has been accessed, the multi-agent system host operates to return the third gateway to an inactive state.

12. The method according to claim 9, wherein accessing the trusted host through the third gateway is over a wireless link, and wherein the wireless link includes at least one of a satellite link or a WIFI link.

13. The method according to claim 9, wherein, in response to determining that the detected anomaly is indicative of a security threat, issuing, by the multi-agent system host, an alert.

14. An apparatus for monitoring for security threats in computer network traffic, the apparatus comprising:
a multi-agent host; and
a memory for storing instructions executable by the multi-agent system host to:
monitor, by the multi-agent system host, a first stream of traffic between a network to be protected and a second network through a first gateway;
determine, by the multi-agent system host, whether the first stream of traffic being monitored includes traffic between the network to be protected and a new host in the second network;
in response to determining the traffic between the network to be protected and the new host in the second network, access, by the multi-agent system host, the new host through a second gateway to generate a second stream of traffic; and
compare, by the multi-agent system host, the first stream of traffic between the network to be protected and the new host through the first gateway and the second stream of traffic between the multi-agent system host and the new host through the second gateway to detect an anomaly therebetween.

15. The apparatus according to claim 14, wherein the multi-agent system host comprises a first interface for monitoring traffic between the network to be protected and the second network and a second interface for accessing the second network through the second gateway.

16. The apparatus according to claim 14, wherein the multi-agent system host is further configured to execute instructions stored in the memory to:
monitor, by the multi-agent system host, for an exception to an established pattern in traffic between the network to be protected and a particular host in the second network through the first gateway; and
in response to determining the exception to the established pattern in the traffic between the network to be protected and the particular host in the second network, access, by the multi-agent system host, the particular host through the second gateway and compare (i) traffic between the network to be protected and the particular host through the first gateway and (ii) traffic between the multi-agent system host and the particular host through the second gateway to detect an anomaly therebetween.

17. The apparatus according to claim 14, wherein comparing comprises at least one of comparing the first stream of traffic and the second stream of traffic to ascertain if traffic through one of the gateways violates a protocol, but traffic through the other gateway does not; or comparing the first stream of traffic and the second stream of traffic to ascertain if a traffic pattern exists through one of the gateways but not through the other gateway.

18. The apparatus according to claim 14, wherein accessing the new host though the second gateway comprises using at least one of common ports or common protocols as used by traffic through the first gateway.

19. The apparatus according to claim 14, further comprising:
- in response to detecting the anomaly, accessing, by the multi-agent system host, a trusted host through a third gateway to cause the trusted host to communicate with the network to be protected through the first gateway and to communicate with the multi-agent system host through the second gateway; and
- comparing, by the multi-agent system host, (i) traffic between the network to be protected and the trusted host through the first gateway and (ii) traffic between the multi-agent system host and the trusted host through the second gateway to verify whether or not the detected anomaly is indicative of a security threat to the network to be protected.

20. A non-transitory computer readable medium comprising instructions that when executed by a multi-agent system host computer processing means causes cause the multi-agent system host processing means to:
- monitor, by the multi-agent system host, a first stream of traffic between a network to be protected and a second network through a first gateway;
- determine, by the multi-agent system host, whether the first stream of traffic being monitored includes traffic between the network to be protected and a new host in the second network;
- in response to determining the traffic between the network to be protected and the new host in the second network, access, by the multi-agent system host, the new host through a second gateway to generate a second stream of traffic; and
- compare, by the multi-agent system host, the first stream of traffic between the network to be protected and the new host through the first gateway and the second stream of traffic between the multi-agent system host and the new host through the second gateway to detect an anomaly therebetween.

* * * * *